(12) United States Patent
Han

(10) Patent No.: US 9,813,570 B2
(45) Date of Patent: Nov. 7, 2017

(54) INFORMATION PROCESSING APPARATUS, INFORMATION PROCESSING METHOD, AND COMPUTER PROGRAM PRODUCT

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/143,914

(22) Filed: May 2, 2016

(65) Prior Publication Data
US 2016/0337536 A1    Nov. 17, 2016

(30) Foreign Application Priority Data

May 11, 2015 (JP) .................................. 2015-96654
Apr. 25, 2016 (JP) ................................ 2016-087486

(51) Int. Cl.
| | | |
|---|---|---|
| G06F 15/00 | (2006.01) | |
| H04N 1/00 | (2006.01) | |
| G06F 3/14 | (2006.01) | |
| H04L 29/08 | (2006.01) | |
| G06F 3/147 | (2006.01) | |

(52) U.S. Cl.
CPC .......... *H04N 1/00464* (2013.01); *G06F 3/14* (2013.01); *G06F 3/147* (2013.01); *H04L 67/125* (2013.01); *H04L 67/34* (2013.01); *H04N 1/00244* (2013.01); *H04N 1/00344* (2013.01); *H04N 1/00938* (2013.01); *G09G 2370/022* (2013.01); *G09G 2370/16* (2013.01); *H04N 2201/0039* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2002/0144257 A1 | 10/2002 | Matsushima | |
| 2007/0245358 A1* | 10/2007 | Hattori | .................. G06F 3/1204 719/321 |
| 2011/0276959 A1* | 11/2011 | Kobayashi | ................ G06F 8/61 717/174 |
| 2011/0276960 A1 | 11/2011 | Nakamoto | |
| 2013/0182282 A1 | 7/2013 | Nakayama et al. | |

FOREIGN PATENT DOCUMENTS

| | | |
|---|---|---|
| JP | 2002-152458 | 5/2002 |
| JP | 2011-237881 | 11/2011 |
| JP | 2013-168130 | 8/2013 |

* cited by examiner

*Primary Examiner* — Saeid Ebrahimi Dehkordy
(74) *Attorney, Agent, or Firm* — Harness, Dickey & Pierce P.L.C.

(57) ABSTRACT

An information processing apparatus is connectable to a server via a network, and includes an acquisition unit, a first display control unit, a storage unit, and a permission control unit. The acquisition unit acquires a first screen including an execution procedure of a first command from the server. The first display control unit performs control to display the first screen acquired by the acquisition unit. The storage unit stores therein one or more pieces of command information indicating information on a command permitted to be executed. The permission control unit does not permit execution of the first command when the one or more pieces of command information stored in the storage unit include no command information corresponding to the execution procedure of the first command selected from the first screen.

20 Claims, 13 Drawing Sheets installer://installApp?id=49354

| PROPER SCHEME | DESCRIPTION |
|---|---|
| http | GENERIC SCHEME FOR WEB ACCESS |
| https | GENERIC SCHEME FOR SSL/TLS-ENCODED WEB ACCESS |
| file | GENERIC SCHEME FOR ACCESS TO LOCAL FILE |
| about | GENERIC SCHEME FOR DISPLAY OF PAGE OR DETAILED SETTINGS |
| ftp | GENERIC SCHEME FOR TRANSMITTING/RECEIVING FILE WITH FTP |
| installer | CUSTOM SCHEME FOR EXECUTING COMMAND TO INSTALL APPLICATION |

INFORMATION PROCESSING APPARATUS, INFORMATION PROCESSING METHOD, AND COMPUTER PROGRAM PRODUCT

CROSS-REFERENCE TO RELATED APPLICATION(S)

The present application claims priority under 35 U.S.C. §119 to Japanese Patent Application No. 2015-096654 filed on May 11, 2015 and Japanese Patent Application No. 2016-087486 filed on Apr. 25, 2016. The contents of which are incorporated herein by reference in their entirety.

BACKGROUND OF THE INVENTION

1. Field of the Invention

The present invention relates to information processing apparatuses, information processing methods and computer program products.

2. Description of the Related Art

There have been known systems that allow applications to be downloaded and installed from web pages provided by web servers.

For example, Japanese Unexamined Patent Application Publication No. 2011-237881 discloses that a multifunction peripheral (MFP) downloads software in cooperation with a distribution server that distributes the software, and installs the downloaded software.

According to the typical technique, for example, a user using an information processing apparatus, such as the MFP, presses a user interface (UI), such as a button or a link, on a web page provided by a web server, a command that has been associated with the UI is unconditionally executed on the information processing apparatus. Consequently, in a situation in which, for example, an application that is not permitted to be installed has been installed on the information processing apparatus without notice, if the user presses a UI (UI on a web page) associated with a command (such as a start command) for the application, an unpermitted command may be executed.

SUMMARY OF THE INVENTION

According to one aspect of the present invention, an information processing apparatus is connectable to a server via a network, and includes an acquisition unit, a first display control unit, a storage unit, and a permission control unit. The acquisition unit acquires a first screen including an execution procedure of a first command from the server. The first display control unit performs control to display the first screen acquired by the acquisition unit. The storage unit stores therein one or more pieces of command information indicating information on a command permitted to be executed. The permission control unit does not permit execution of the first command when the one or more pieces of command information stored in the storage unit include no command information corresponding to the execution procedure of the first command selected from the first screen.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
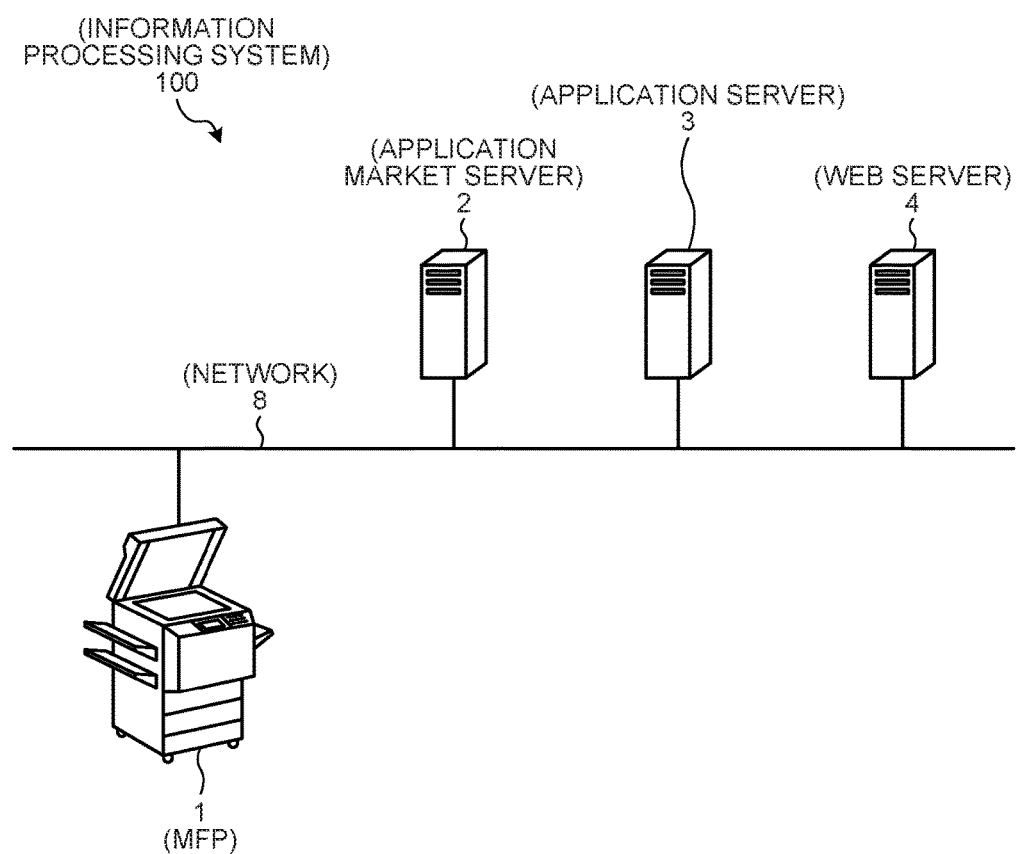
FIG. 1 is a schematic diagram illustrating an exemplary structure of an information processing system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

An object of embodiments is to provide an information processing apparatus, an information processing method, a computer program product that are capable of preventing the execution of the unpermitted command.

The following describes embodiments of an information processing apparatus, an information processing method, and a computer program according to the present invention in detail with reference to the accompanying drawings. In the following embodiments, a multifunction peripheral (MFP) as one form of an image forming apparatus will be described as an example of the information processing apparatus according to the present invention. However, the embodiments are not limited to the MFP. The MFP has a plurality of different functions, such as copier, scanner, printer, and facsimile functions.

First Embodiment

FIG. 1 is a schematic diagram illustrating an exemplary structure of an information processing system 100 in a first embodiment. As illustrated in FIG. 1, the information processing system 100 includes an MFP 1, an application market server 2, an application server 3, and a web server 4, which are coupled to one another via a network 8.

The application market server 2 is an example of a "server" connectable to the MFP 1 via the network 8, and provides to the MFP 1 an application list screen that associates each of a plurality of applications with a command to install the application to the MFP 1. More specific details will be described later. In this example, the following applications are installed in advance on the MFP 1: an application that provides a function to acquire the application list screen from the application market server 2 and display the acquired application list screen on the MFP 1 (which may be called below the "application market application" in some cases); an application that provides a function to control installation of an application selected by a user from the applications displayed on the application list screen onto the MFP 1 (which may be called below the "installer" in some cases); and an application that manages proper schemes (to be described later) (which may be called below the "command management application" in some cases). The function of the application market application is implemented by using an application to provide functions of a web browser, so the application market application may be generically called the "browser application" in some cases. The specific details of the MFP 1 will be described later.

The application server 3 holds the applications displayed on the application list screen, and distributes an application according to a request from the MFP 1. The web server 4 provides a web page according to a request from the MFP 1. The web page displays user interfaces (UIs), such as links and buttons, associated with commands for certain applications. The specific details of the above will be described later.

Figure 2:
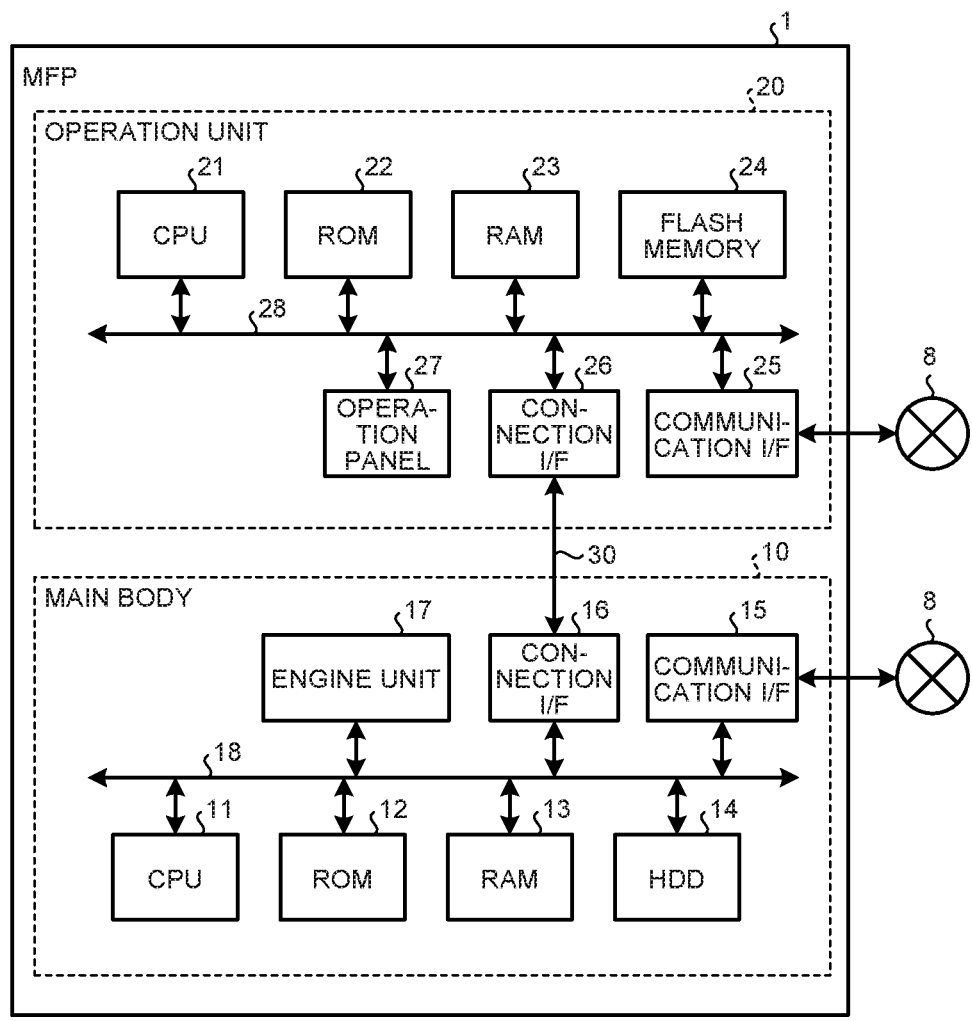
FIG. 2 is a schematic diagram illustrating an exemplary hardware structure of a multifunction peripheral (MFP)

The following describes a hardware structure of the MFP 1 with reference to FIG. 2. As illustrated in FIG. 2, the MFP 1 includes a main body 10 that can implement various functions, such as the copier, scanner, facsimile, and printer functions, and an operation unit 20 that receives user's operations. The receiving of the user's operations refers to a concept including receiving information (including, for example, signals representing coordinate values on the screen) entered according to the user's operation. The main body 10 and the operation unit 20 are coupled via a dedicated communication path 30 so as to be able to communicate with each other. The communication path 30 may be one that is compliant with the Universal Serial Bus (USB) standard, but may be compliant with any standard regardless of whether the standard is for wired or wireless communication.

The main body 10 can operate in accordance with the operation received by the operation unit 20. The main body 10 can communicate with an external apparatus such as a client personal computer (PC) and also operate in accordance with an instruction received from the external apparatus.

The following first describes a hardware structure of the main body 10. As illustrated in FIG. 2, the main body 10 includes a central processing unit (CPU) 11, a read only memory (ROM) 12, a random access memory (RAM) 13, a hard disk drive (HDD) 14, a communication interface (I/F) 15, a connection I/F 16, and an engine unit 17. These components are coupled with one another via a system bus 18.

The CPU 11 overall controls the operation of the main body 10. The CPU 11 executes a computer program stored in the ROM 12 or the HDD 14, for example, using the RAM 13 as a working area to control the overall operation of the main body 10, thereby achieving the various functions such as the copier, scanner, facsimile, and printer functions.

The communication I/F 15 is an interface to connect the main body 10 to the network 8. The connection I/F 16 is an interface to communicate with the operation unit 20 via the communication path 30.

The engine unit 17 is hardware that performs versatile information processing and processing other than communication for achieving the copier, scanner, facsimile, and printer functions. The engine unit 17 includes a scanner (image reading section) that scans and reads an image on a document, a plotter (image forming section) that performs printing on a sheet material such as a sheet, and a facsimile section that performs facsimile communication, for example. The engine unit 17 may further include specific options such as a finisher that sorts the sheet materials after printing and an automatic document feeder (ADF) that automatically feeds documents.

The following describes a hardware structure of the operation unit 20. As illustrated in FIG. 2, the operation unit 20 includes a CPU 21, a ROM 22, a RAM 23, a flash memory 24, a communication I/F 25, a connection I/F 26, and an operation panel 27. These components are coupled with one another via a system bus 28.

The CPU 21 overall controls the operation of the operation unit 20. The CPU 21 executes a computer program stored in the ROM 22 or the flash memory 24, for example, using the RAM 23 as a working area to control the overall operation of the operation unit 20, thereby achieving various functions such as displaying of information (images) according to the input received from a user. The functions are described later.

The communication I/F 25 is an interface to connect the operation unit 20 to the network 8. The connection I/F 26 is an interface to communicate with the main body 10 via the communication path 30.

The operation panel 27 receives various types of input according to the user's operation and displays various types of information (e.g., information according to the received operation, information indicating an operation status of the MFP 1, and information indicating a setting condition). While in this example, the operation panel 27 includes a liquid crystal display (LCD) having a touch panel function, but the embodiment is, however, not limited thereto. For example, the operation panel 27 may include an organic electroluminescence (EL) display having a touch panel function. Furthermore, the operation panel 27 may be provided with an operation unit such as hardware keys and a display unit such as a lamp in addition to or instead of the display having a touch panel function.

Figure 3:
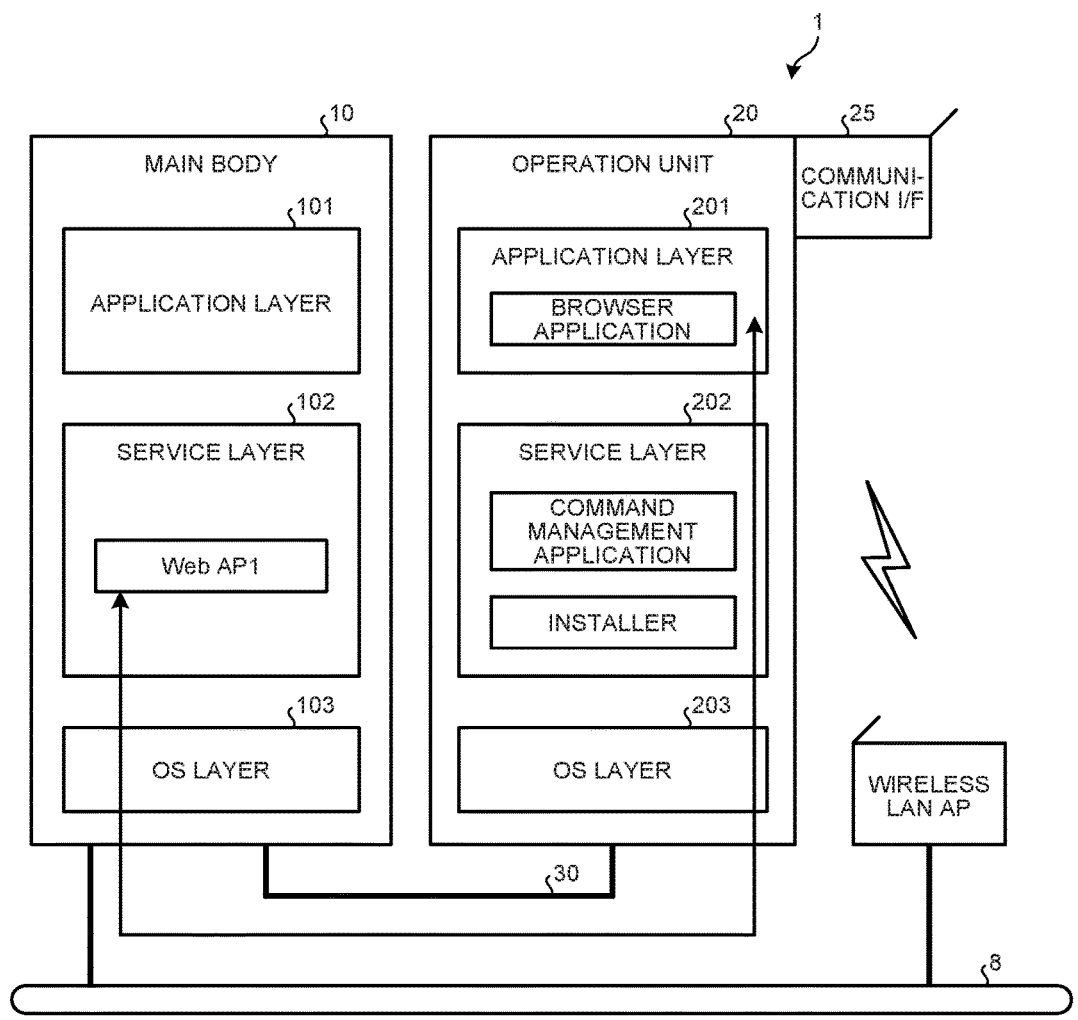
FIG. 3 is a schematic diagram illustrating an exemplary software structure of the MFP.

The following describes a software structure of the MFP 1. FIG. 3 is a schematic diagram illustrating an exemplary software structure of the MFP 1. As illustrated in FIG. 3, the main body 10 includes an application layer 101, a service layer 102, and an OS layer 103. The application layer 101, the service layer 102, and the OS layer 103 are in fact various types of software stored in the ROM 12 and the HDD 14, for example. The CPU 11 executes the various types of software to provide the various functions.

The application layer 101 is application software (in the following description, may be described simply as the "application" in some cases) that causes the hardware resources to operate and provide a certain function. Examples of the application include a copier application that provides the copier function, a scanner application that provides the scanner function, a facsimile application that provides the facsimile function, and a printer application that provides the printer function.

The service layer 102, which is present between the application layer 101 and the OS layer 103, is software that provides an interface to the applications for using the hardware resources included in the main body 10. More specifically, the service layer 102 receives requests to operate the hardware resources and provides a function to arbitrate the operation requests. Examples of the operation requests received by the service layer 102 include a request for the scanner to perform reading and a request for the plotter to perform printing.

The interface function of the service layer 102 is provided to not only the application layer 101 of the main body 10 but also an application layer 201 of the operation unit 20. The application layer 201 (application) of the operation unit 20 thus can also achieve the functions using the hardware resources (e.g., the engine unit 17) of the main body 10 via the interface function of the service layer 102. For example, the interface function of the service layer 102 is provided by a Web API.

The OS layer 103 is basic software (operating system (OS)) that provides a basic function to control the hardware included in the main body 10. The service layer 102, which is software, converts requests to use the hardware resources from the various applications into commands that the OS layer 103 can interpret, and then transfers the commands to the OS layer 103. The OS layer 103, which is software, executes the commands. As a result, the hardware resources operate in accordance with the requests from the applications.

The operation unit 20 includes the application layer 201, a service layer 202, and an OS layer 203. The hierarchical structure among the application layer 201, the service layer 202, and the OS layer 203 of the operation unit 20 is the same as that of the main body 10. The function provided by the application of the application layer 201 and the type of operation request that the service layer 202 can receive differ from those in the main body 10. The application layer 201 is software that mainly provides a function of a user interface (UI) to operate or display the functions (copier, scanner, facsimile, and printer functions) included in the main body 10. The application layer 201 may be software that operates the hardware resource included in the operation unit 20 to provide a certain function. In this example, the application layer 201 includes, for example, the browser application (application market application), and the service layer 202 includes, for example, the installer and the command management application.

In the embodiment, the software of the OS layer 103 of the main body 10 and the software of the OS layer 203 of the operation unit 20 differ from each other in order to keep independence between the functions of the main body 10 and the operation unit 20. The main body 10 and the operation unit 20 thus operate independently from each other under the different operating systems. For example, Linux (registered trademark) may be adopted as the software of the OS layer 103 of the main body 10, while Android (registered trademark) may be adopted as the software of the OS layer 203 of the operation unit 20.

As described above, the main body 10 and the operation unit 20 operate under different operating systems in the MFP 1 in the embodiment. The communication between the main body 10 and the operation unit 20 thus is not performed as an inter-process communication in the common apparatus, but as a communication between different apparatuses. Examples of the communication between different apparatuses include the operation (command communication) that transmits the information (the content of the instruction from the user) received by the operation unit 20 to the main body 10, and the operation of the main body 10 to notify the operation unit 20 of an event. The operation unit 20 thus can use the functions of the main body 10 by performing the command communication with the main body 10. Examples of an event of which the operation unit 20 is notified by the main body 10 include an implementation state of the operation in the main body 10 and contents set by the main body 10.

In the embodiment, power is supplied to the operation unit 20 from the main body 10 via the communication path 30, thereby making it possible to perform power supply control separately (independently) for the operation unit 20 and the main body 10.

Figure 4:
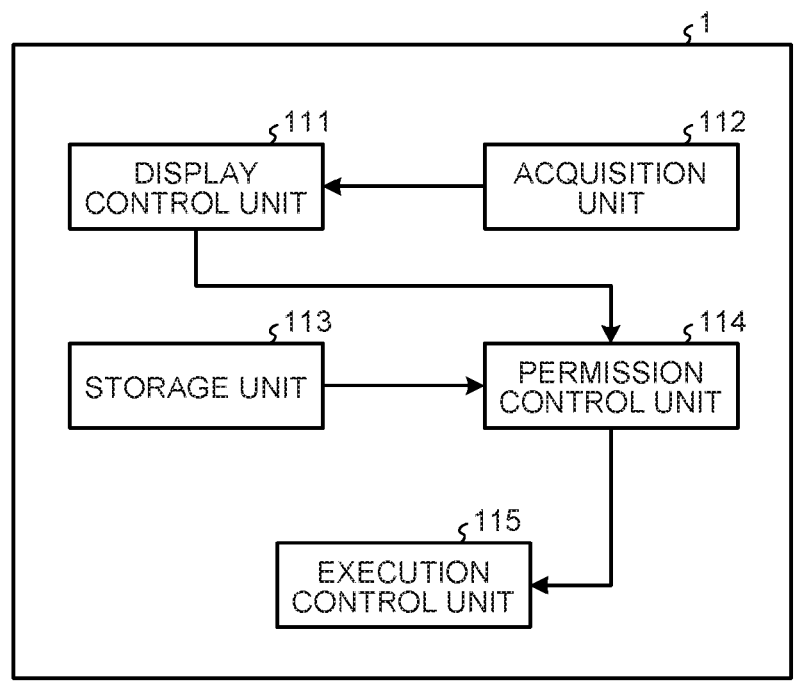
FIG. 4 is a schematic diagram illustrating exemplary functions of the MFP in a first embodiment.

The following describes functions of the MFP 1. FIG. 4 is a schematic diagram illustrating exemplary functions of the MFP 1. As illustrated in FIG. 4, the MFP 1 includes a display control unit 111, an acquisition unit 112, a storage unit 113, a permission control unit 114, and an execution control unit 115. FIG. 4 exemplarily illustrates mainly the functions relating to the present invention for expository convenience. The functions included in the MFP 1 are, however, not limited to those illustrated in FIG. 4.

Figure 5:
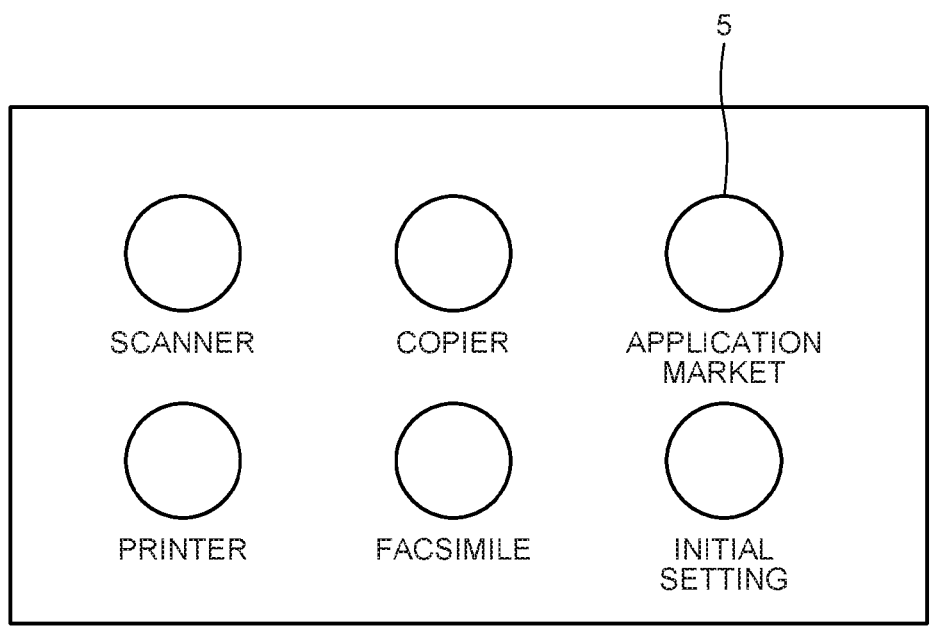
FIG. 5 is a schematic diagram illustrating an exemplary operation screen.

The display control unit 111 performs control to display a screen on the operation panel 27. For example, the display control unit 111 performs control to display an operation screen for various operations on the operation panel 27. FIG. 5 is a schematic diagram illustrating an exemplary operation screen, on which an icon 5 for starting the application market application is displayed. The display control unit 111 has a function (function of a first display control unit) to control display of a first screen acquired by the acquisition unit 112 (to be described later). The display control unit 111 also has a function (function of a second display control unit) to control display of a second screen indicating that a first command cannot be executed when the permission control unit 114 (to be described later) does not permit execution of the first command. The above will be described in detail later.

Referring back to FIG. 4, the acquisition unit 112 acquires the first screen including an execution procedure of the first command from the application market server 2. In this example, the execution procedure of the first command is represented by a Uniform Resource Locator (URL) scheme, and the acquisition unit 112 can acquire, from the application market server 2, the application list screen in which a URL scheme describing the execution procedure of an install command is associated with each of the applications, or can acquire, from the web server 4, the web page (which may be called below the "web screen" in some cases for expository convenience) displaying UIs, such as links and buttons, each associated with a URL scheme describing the execution procedure of a certain command. In this example, the application list screen or the web screen corresponds to a "first screen" in the claims.

In the present embodiment, when the user touches the icon 5, the browser application (acquisition unit 112) transmits a signal requiring the application list screen (which may be called below the "application list screen request" in some cases) to the application market server 2. The browser application acquires the application list screen as a response to the application list screen request from the application market server 2. In the present embodiment, when the user performs an operation on the operation screen to enter the URL of the web server 4, the browser application (acquisition unit 112) transmits a signal requiring the web screen (which may be called below the "web request" in some cases) to the web server 4. The browser application acquires the web screen as a response to the web request from the web server 4.

Figures 6, 7:
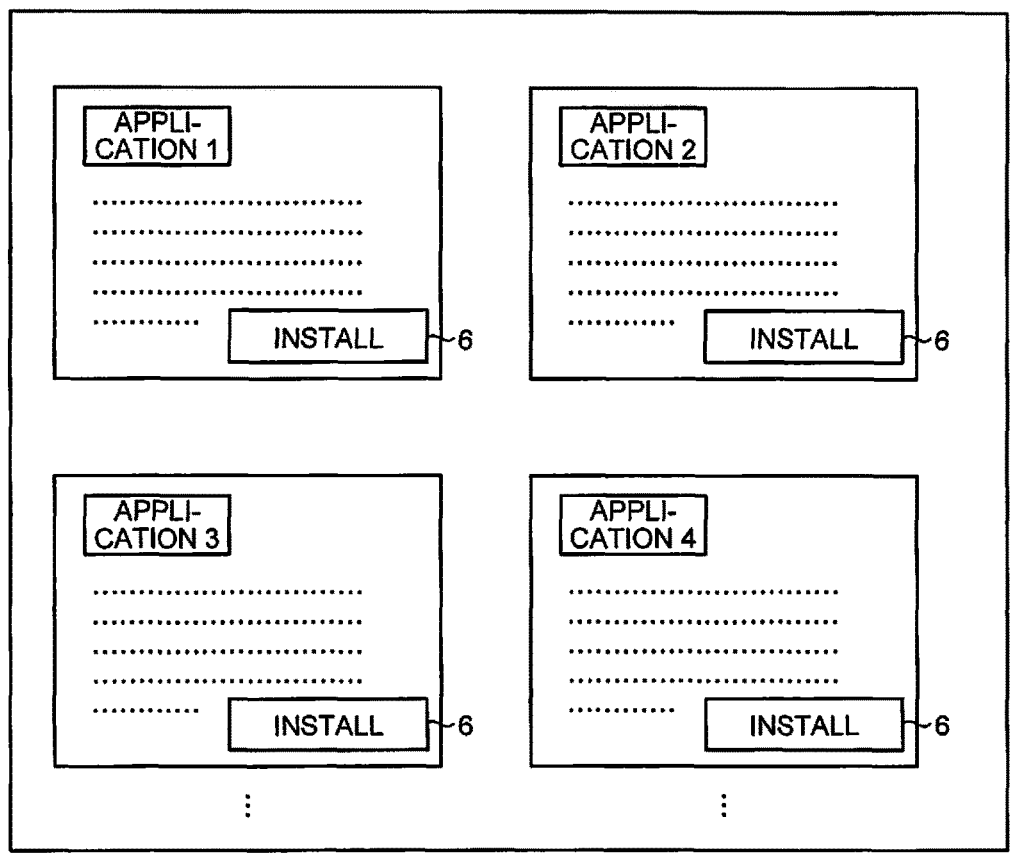
FIG. 6 is schematic diagram illustrating an exemplary application list screen.
FIG. 7 is a schematic diagram illustrating an exemplary Uniform Resource Locator (URL) scheme.

The following describes an exemplary case where the first screen is the application list screen. FIG. 6 is schematic diagram illustrating an exemplary application list screen. In the example of FIG. 6, the application list screen displays, for each of the applications, explanatory information explaining the details about the application and a button 6 for instructing to install the application (which will be called below the "install button 6"). In this example, the URL scheme describing the execution procedure of the install command is associated with the install button 6 corresponding to the application. In this example, pressing the install button 6 results in selection of the URL scheme associated with the install button 6. The following describes an exemplary case where the execution procedure of the first command is the execution procedure of the install command. The execution procedure of the install command is represented by the URL scheme. The header of the URL scheme represents information for identifying an application that executes the command or information for identifying the execution procedure of the command (for identifying the type of the execution procedure of the command).

FIG. 7 is a schematic diagram illustrating an exemplary URL scheme associated with the install button 6 corresponding to an application identified by an identifier (ID, that is, application ID) of "49354". The part in FIG. 7 expressed as "installer" serves as the header of the URL scheme. In the following description, the header of the URL scheme may be called the "scheme part" in some cases. In the example of FIG. 7, the scheme part expressed as "installer" represents the information for identifying the application that executes the install command, and represents an installer installed on the MFP 1 in this example. In the part expressed as "installApp?id=49354" in FIG. 7, the portion expressed as "installApp" serves as the install command, and the portion expressed as "id=49354" serves as an argument of the install command. This part represents the install command for the application identified by the ID "49354". That is, this part represents the specific content of the command.

Thus, the URL scheme illustrated in FIG. 7 is information describing the execution procedure of the install command in a URL format. If this URL scheme is selected, the installer starts, and executes the command to install the application identified by the ID of "49354".

Referring back to FIG. 4, the display control unit 111 performs control to display the first screen acquired by the acquisition unit 112. In the present embodiment, the display control unit 111 performs control to display the application list screen or the web screen acquired by the acquisition unit 112 on the operation panel 27.

Figures 8, 9:
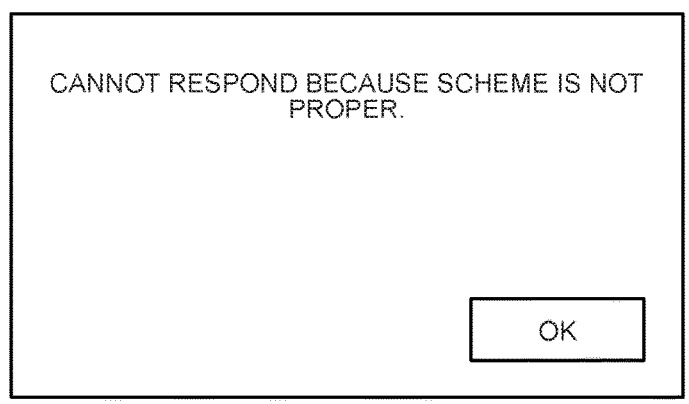
FIG. 8 is a schematic diagram illustrating exemplary proper schemes stored in a storage unit.
FIG. 9 is a schematic diagram illustrating an exemplary second screen.

The storage unit 113 stores therein one or more pieces of command information indicating information on a command permitted to be executed. In this example, the command information is information for identifying the execution procedure of the command permitted to be executed or information for identifying the application that executes the command permitted to be executed. The storage unit 113 stores therein the scheme portion (header) of the URL scheme representing the execution procedure of the command permitted to be executed as the command information (which will be called the "proper scheme" in the following description). In this example, the command information (proper scheme) mentioned above is represented by the information in the header of the URL scheme. FIG. 8 is a schematic diagram illustrating exemplary proper schemes stored in the storage unit 113. The proper scheme "http" illustrated in FIG. 8 is a generic scheme that identifies the execution procedure of a command to gain access via a website (web access command). The proper scheme "https" illustrated in FIG. 8 is a generic scheme that identifies the execution procedure of a web access command encoded with the Secure Sockets Layer/Transport Layer Security (SSL/TLS) protocol. The proper scheme "file" illustrated in FIG. 8 is a generic scheme that identifies the execution procedure of a command to access a local file. The proper scheme "about" illustrated in FIG. 8 is a generic scheme that identifies the execution procedure of a command to display a page or detailed settings. The proper scheme "ftp" illustrated in FIG. 8 is a generic scheme that identifies the execution procedure of a command to transmit or receive a file using a file transfer protocol (FTP). In addition, the proper scheme "installer" illustrated in FIG. 8 is a custom scheme that identifies the application that executes the command to install the application, and that is defined by the user. The number and types of the proper schemes stored in the storage unit 113 can be freely changed.

Referring back to FIG. 4, when the one or more proper schemes stored in the storage unit 113 include no proper scheme corresponding to the execution procedure of the first command selected from the first screen (in this example, the application list screen or the web screen), the permission control unit 114 does not permit the execution of the first command. In the present embodiment, when the one or more proper schemes stored in the storage unit 113 include no proper scheme that coincides with the scheme portion (header) of the URL scheme selected from the first screen (the application list screen or the web screen), the permission control unit 114 does not permit the execution of the command of which the execution procedure is indicated by the URL scheme selected from the first screen.

In contrast, when the one or more proper schemes stored in the storage unit 113 include a proper scheme corresponding to the execution procedure of the first command selected from the first screen, the permission control unit 114 permits the execution of the first command. More specific details will be described later.

When the permission control unit 114 does not permit the execution of the first command, the display control unit 111 performs control to display the second screen indicating that the first command cannot be executed. FIG. 9 is a schematic diagram illustrating an exemplary second screen. When the permission control unit 114 does not permit the execution of the first command, the display control unit 111 performs control to display the second screen illustrated in FIG. 9 on the operation panel 27.

Referring back to FIG. 4, when the permission control unit 114 permits the execution of the first command, the execution control unit 115 performs control to execute the first command. While more specific details will be described later, when the first command is, for example, an install command, the execution control unit 115 performs control to execute the install command when the permission control unit 114 permits the execution of the install command.

In this example, the operation unit 20 provides the above-described functions of the display control unit 111, the acquisition unit 112, the storage unit 113, the permission control unit 114, and the execution control unit 115. The CPU 21 implements the functions of the display control unit 111, the acquisition unit 112, the permission control unit 114, and the execution control unit 115 by executing a computer program stored in, for example, the ROM 22. The functions are, however, not limited to being implemented as described above. A dedicated hardware circuit may implement at least some of the functions of the display control unit 111, the acquisition unit 112, the permission control unit 114, and the execution control unit 115. The storage unit 113 can be implemented by, for example, the flash memory 24. Of the functions of the acquisition unit 112 described above, the function to transmit the application list screen request to the application market server 2 and the function to acquire (receive) the application list screen from the application market server 2 may be considered to be implemented by a combination of the CPU 21 for executing the computer program and the communication I/F 25. For example, in the case of transmitting the application list screen request to the application market server 2, the CPU 21 controls the communication I/F 25 so as to transmit the application list screen request to the application market server 2. For example, in the case of receiving the application list screen from the application market server 2, the communication I/F 25 receives the application list screen from the application market server 2. The communication I/F 25 then notifies the CPU 21 of the application list screen received from the application market server 2. This notification allows the CPU 21 to detect the reception of the application list screen.

Figure 10:
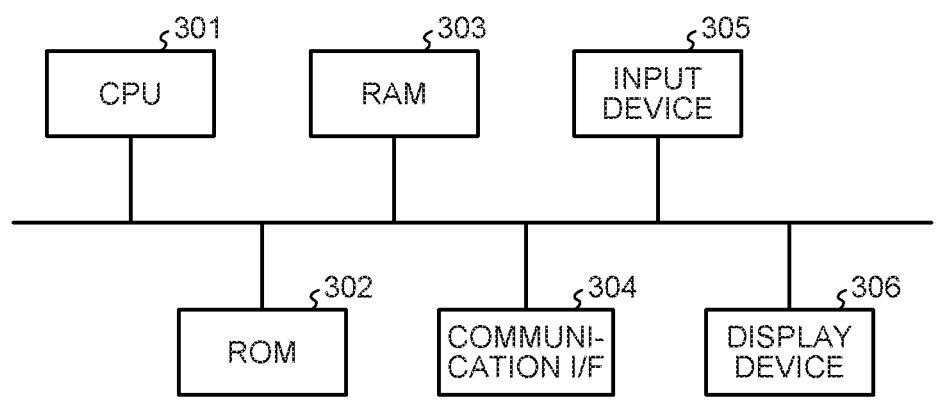
FIG. 10 is a schematic diagram illustrating an exemplary hardware structure of an application market server.

The following describes structures of the application market server 2, the application server 3, and the web server 4. FIG. 10 is a schematic diagram illustrating an exemplary hardware structure of the application market server 2. The hardware structures of the application server 3 and the web server 4 are the same as the structure illustrated in FIG. 10.

As illustrated in FIG. 10, the application market server 2 includes a CPU 301, a ROM 302, a RAM 303, a communication I/F 304, an input device 305, and a display device 306. The CPU 301 overall controls the operation of the application market server 2. The ROM 302 is a nonvolatile memory that stores therein various types of data such as programs. The RAM 303 is a volatile memory that functions as a working area of various types of processing executed by the CPU 301. The communication I/F 304 is an interface to connect the application market server 2 to the network 8. The input device 305 is used for the user's operation input. The input device 305 includes a mouse and a keyboard, for example. The display device 306 displays various types of information. The display device 306 includes a liquid crystal display, for example.

Figure 11:
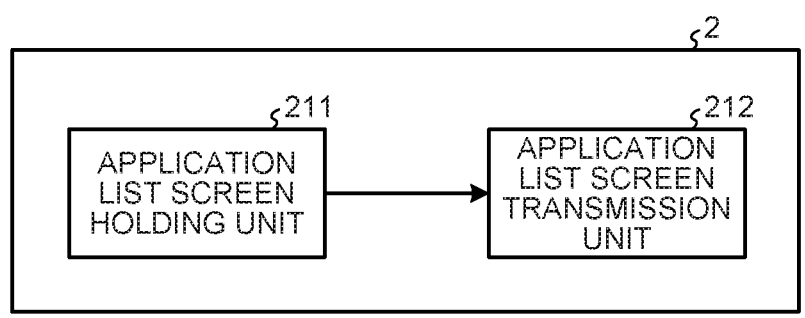
FIG. 11 is a schematic diagram illustrating exemplary functions of the application market server.

FIG. 11 is a schematic diagram illustrating exemplary functions of the application market server 2. As illustrated in FIG. 11, the application market server 2 includes an application list screen holding unit 211 and an application list screen transmission unit 212. FIG. 11 exemplarily illustrates mainly the functions relating to the present invention for expository convenience. The functions included in the application market server 2 are, however, not limited to those illustrated in FIG. 11.

The application list screen holding unit 211 holds the application list screen. If the application list screen request is received from the MFP 1, the application list screen transmission unit 212 transmits the application list screen held in the application list screen holding unit 211 to the MFP 1 as a response to the application list screen request.

In the present embodiment, the CPU 301 implements the function of the application list screen transmission unit 212 described above by executing a computer program stored in, for example, the ROM 302. The function is, however, not limited to being implemented as described above. For example, a dedicated hardware circuit (such as a semiconductor integrated circuit) may implement the function. The application list screen holding unit 211 may be implemented using, for example, an auxiliary storage device, such as an HDD. The function of the application list screen transmission unit 212 may be considered to be implemented by a combination of the CPU 301 for executing the computer program and the communication I/F 304.

Figure 12:
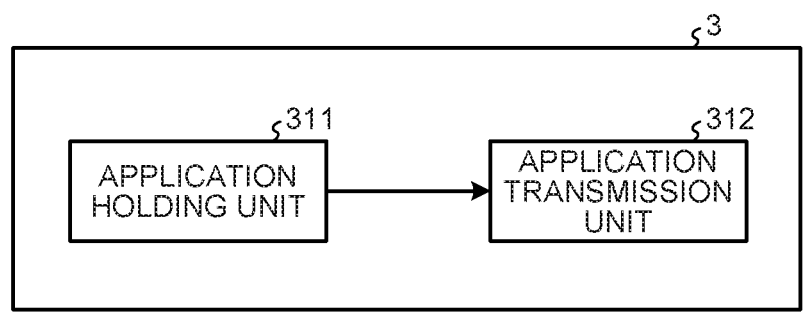
FIG. 12 is a schematic diagram illustrating exemplary functions of an application server.

FIG. 12 is a schematic diagram illustrating exemplary functions of the application server 3. As illustrated in FIG. 12, the application server 3 includes an application holding unit 311 and an application transmission unit 312. FIG. 12 exemplarily illustrates mainly the functions relating to the present invention for expository convenience. The functions included in the application server 3 are, however, not limited to those illustrated in FIG. 12.

The application holding unit 311 holds a plurality of applications. The application transmission unit 312 transmits one of the applications held in the application holding unit 311 to the MFP 1 according to a request (download request) from the MFP 1.

In the present embodiment, the CPU 301 implements the function of the application transmission unit 312 described above by executing a computer program stored in, for example, the ROM 302. The function is, however, not limited to being implemented as described above. For example, a dedicated hardware circuit (such as a semiconductor integrated circuit) may implement the function. The application holding unit 311 may be implemented using, for example, an auxiliary storage device, such as an HDD. The function of the application transmission unit 312 may be considered to be implemented by a combination of the CPU 301 for executing the computer program and the communication I/F 304.

Figure 13:
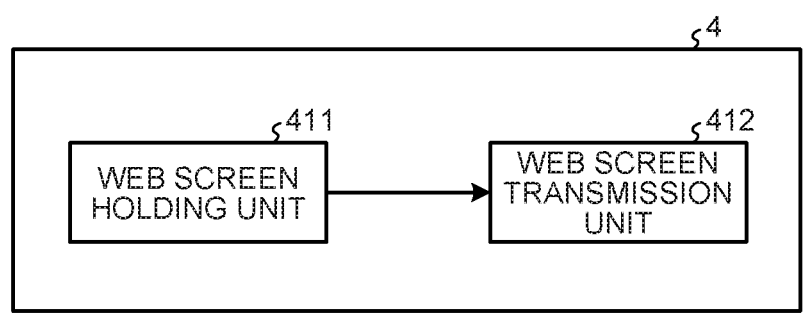
FIG. 13 is a schematic diagram illustrating exemplary functions of a web server.

FIG. 13 is a schematic diagram illustrating exemplary functions of the web server 4. As illustrated in FIG. 13, the web server 4 includes a web screen holding unit 411 and a web screen transmission unit 412. FIG. 13 exemplarily illustrates mainly the functions relating to the present invention for expository convenience. The functions included in the web server 4 are, however, not limited to those illustrated in FIG. 13.

The web screen holding unit 411 holds the web screen. If the web request is received from the MFP 1, the web screen transmission unit 412 transmits the web screen held in the web screen holding unit 411 to the MFP 1 as a response to the web request.

In the present embodiment, the CPU 301 implements the function of the web screen transmission unit 412 described above by executing a computer program stored in, for example, the ROM 302. The function is, however, not limited to being implemented as described above. For example, a dedicated hardware circuit (such as a semiconductor integrated circuit) may implement the function. The web screen holding unit 411 may be implemented using, for example, an auxiliary storage device, such as an HDD. The function of the web screen transmission unit 412 may be considered to be implemented by a combination of the CPU 301 for executing the computer program and the communication I/F 304.

Figure 14:
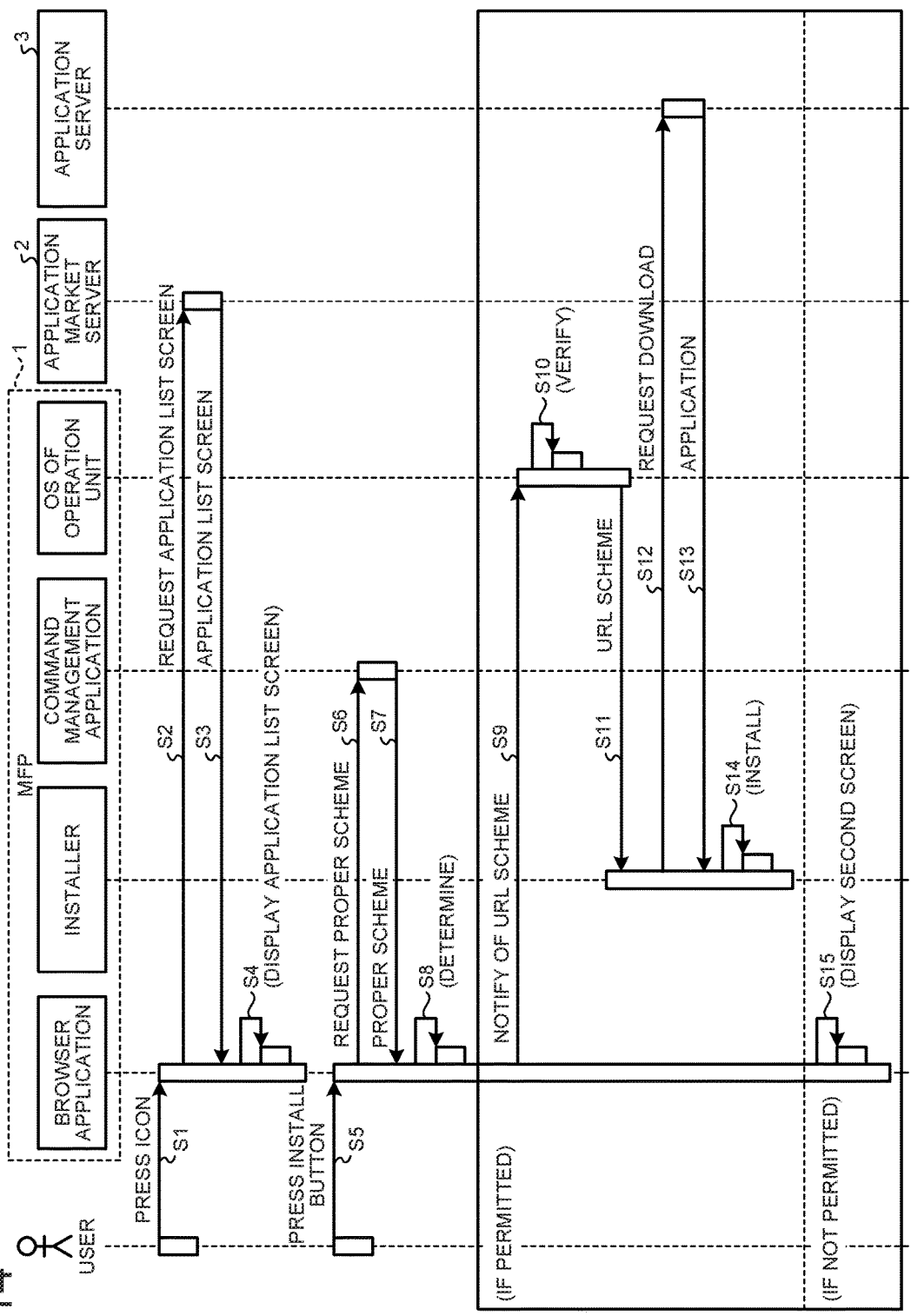
FIG. 14 is a sequence diagram illustrating an exemplary operational procedure of the information processing system in the first embodiment.

The following describes an exemplary operational procedure of the information processing system 100 in the present embodiment. FIG. 14 is a sequence diagram illustrating the exemplary operational procedure of the information processing system 100 in the present embodiment. The following describes an operation example of a case where the user presses any of the install buttons 6 displayed on the application list screen.

First, when the user touches the icon 5 (refer to FIG. 5) on the operation screen (step S1), the browser application transmits the application list screen request to the application market server 2 (step S2). The browser application receives the application list screen from the application market server 2 as a response to the application list screen request (step S3), and displays the received application list screen on the operation panel 27 (step S4).

When the user then presses the install button 6 of any of the applications on the application list screen (step S5), the browser application (permission control unit 114) requests one or more proper schemes from the command management application described above (step S6). After receiving this request, the command management application transmits one or more proper schemes stored in the storage unit 113 to the browser application (step S7). In this example, the command management application is provided as a stand-alone application. However, the embodiments are not limited to this example. For example, the function of the command management application may be implemented by the browser application. For example, the browser application can include a menu on which the proper scheme is defined, and the processes at steps S6 and S7 can be performed by an internal function of the browser application.

After step S7, the browser application (permission control unit 114) extracts the scheme portion of the URL scheme associated with the install button 6 pressed at step S5, and determines whether the one or more schemes received from the command management application include a proper scheme coincident with the extracted scheme portion (step S8).

For example, it is assumed that the URL scheme associated with the install button 6 pressed at step S5 is expressed in the form illustrated in FIG. 7, and the browser application (permission control unit 114) receives the proper schemes illustrated in FIG. 8 from the command management application. In this case, the browser application (permission control unit 114) extracts "installer" as the scheme portion of the URL scheme associated with the install button 6 pressed at step S5. In this example, the proper schemes received from the command management application include the proper scheme "installer" coincident with the extracted scheme portion (refer to FIG. 8), so that the result of step S8 is affirmative. In this case, the browser application (permission control unit 114) permits the execution of the install command of which the execution procedure is indicated by the URL scheme associated with the install button 6 pressed at step S5.

The following describes an operation example of the case where the browser application (permission control unit 114) has permitted the execution of the command of which the execution procedure is indicated by the URL scheme associated with the install button 6 pressed at step S5. In this case, the browser application (permission control unit 114) notifies the OS of the operation unit 20 of the URL scheme associated with the install button 6 pressed at step S5 (step S9).

The OS of the operation unit 20 checks the URL scheme of which the notification has been given (step S10), and verifies that the application that executes the command (install command in this example) of which the execution procedure is indicated by the URL scheme is the installer. The OS of the operation unit 20 then transmits the URL scheme to the installer (step S11). The embodiments are not limited to this. For example, the OS of the operation unit 20 may broadcast the URL scheme to the applications in the operation unit 20, and corresponding one of the applications (the installer in this example) may receive the URL scheme.

After receiving the URL scheme from the OS of the operation unit 20, the installer executes the command of which the execution procedure is indicated by the URL scheme (in this example, the URL scheme illustrated in FIG. 7). More specifically, the installer selects a necessary parameter (portion corresponding to the specific content of the command) from the URL scheme received from the OS of the operation unit 20, and executes processing based on the selected parameter. In this example, the installer requests a download of the application identified by the application ID of "49354" from the application server 3 (step S12), and downloads the application from the application server 3 (step S13). The installer then performs control to install the application downloaded at step S13 onto the MFP 1 (step S14). In this example, the installer can be considered to provide the function of the execution control unit 115 described above.

If the result of step S8 is negative, the browser application (permission control unit 114) does not permit the execution of the command of which the execution procedure is indicated by the URL scheme associated with the install button 6 pressed at step S5. In this case, the browser application (permission control unit 114) does not notify the OS of the operation unit 20 of the URL scheme associated with the install button 6 pressed at step S5. In this case, the browser application (display control unit 111) performs control to display the second screen illustrated in FIG. 9 on the operation panel 27 (step S15).

Figure 15:
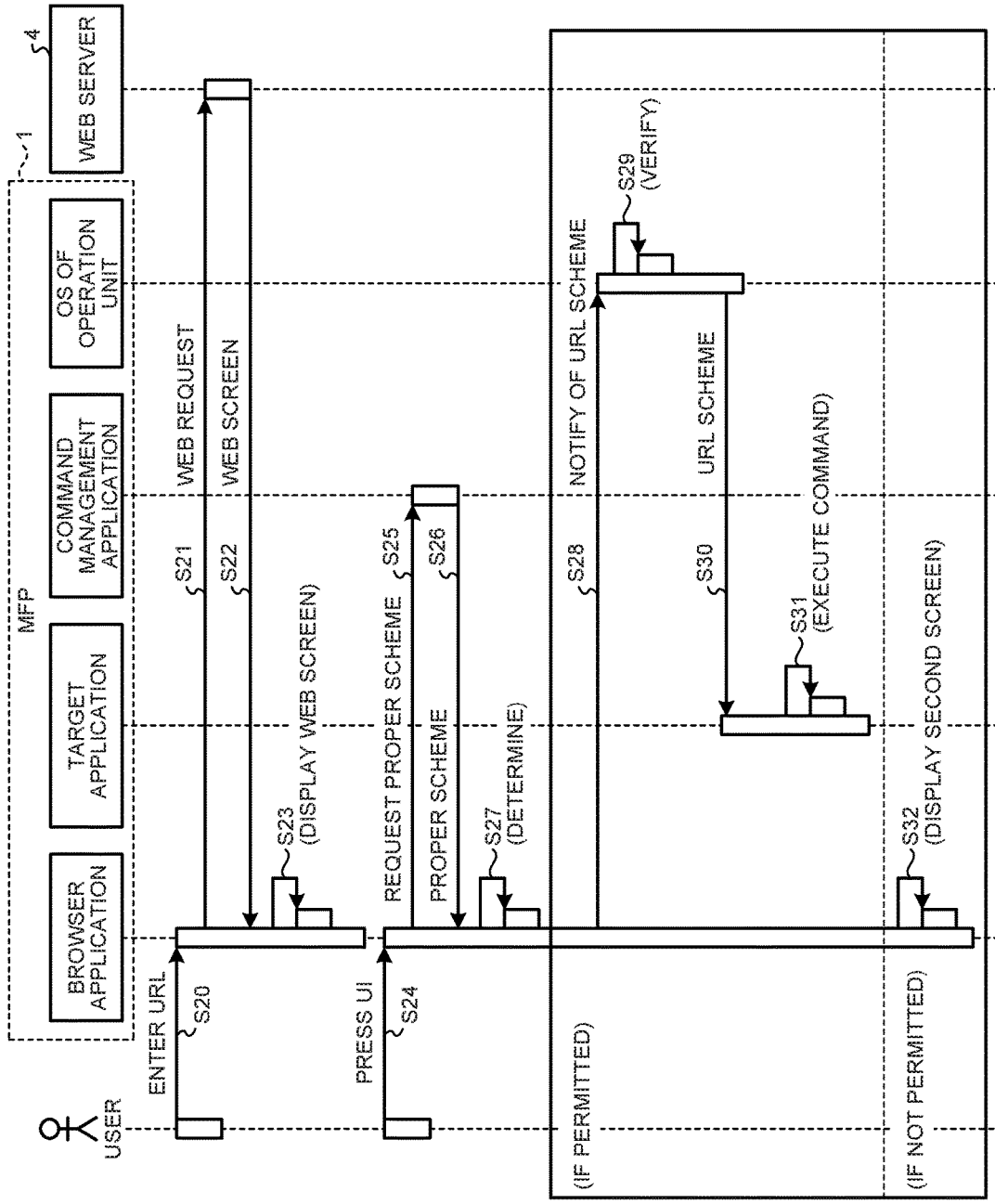
FIG. 15 is a sequence diagram illustrating another exemplary operational procedure of the information processing system in the first embodiment.

The following describes another exemplary operational procedure with reference to FIG. 15. The following describes an operation example of a case where the user presses a UI displayed on the web screen, the UI being associated with a URL scheme (URL scheme indicating the execution procedure of a certain command) indicating to execute a certain command for any application (which is called the "target application" in this example) installed on the MFP 1.

First, when the user performs an operation on the operation screen to enter the URL of the web server 4 (step S20), the browser application (acquisition unit 112) transmits the web request to the web server 4 (step S21). The browser application receives the web screen from the web server 4 as a response to the web request (step S22), and displays the received web screen on the operation panel 27 (step S23).

Then, when the user then presses a UI associated with a URL scheme indicating the execution procedure of a certain command on the web screen (step S24), the browser application (permission control unit 114) requests one or more proper schemes from the command management application (step S25). After receiving this request, the command management application transmits one or more proper schemes stored in the storage unit 113 to the browser application (step S26). The browser application (permission control unit 114) extracts the scheme portion of the URL scheme (URL scheme selected from the web screen) associated with the UI pressed at step S24, and determines whether the one or more proper schemes received from the command management application include a proper scheme coincident with the extracted scheme portion (step S27).

If the result of step S27 is affirmative, the browser application (permission control unit 114) permits the execution of the command of which the execution procedure is indicated by the URL scheme associated with the UI pressed at step S24. The following describes an operation example of the case where the browser application (permission control unit 114) has permitted the execution of the command of which the execution procedure is indicated by the URL scheme associated with the UI pressed at step S24. In this case, the browser application (permission control unit 114) notifies the OS of the operation unit 20 of the URL scheme associated with the UI pressed at step S24 (step S28).

The OS of the operation unit 20 checks the URL scheme of which the notification has been given (step S29), and verifies that the application that executes the command (a certain command in this example) of which the execution procedure is indicated by the URL scheme is the target application. The OS of the operation unit 20 then transmits the URL scheme to the target application (step S30). The embodiments are not limited to this. For example, the OS of the operation unit 20 may broadcast the URL scheme to the applications in the operation unit 20, and corresponding one of the applications (the target application in this example) may receive the URL scheme. After receiving the URL scheme from the OS of the operation unit 20, the target application executes the command of which the execution procedure is indicated by the URL scheme (step S31). In this example, the target application can be considered to provide the function of the execution control unit 115 described above.

If the result of step S27 is negative, the browser application (permission control unit 114) does not permit the execution of the command of which the execution procedure is indicated by the URL scheme associated with the UI pressed at step S24. In this case, the browser application (permission control unit 114) does not notify the OS of the operation unit 20 of the URL scheme associated with the UI pressed at step S24. In this case, the browser application (display control unit 111) performs control to display the second screen illustrated in FIG. 9 on the operation panel 27 (step S32).

Figure 16:
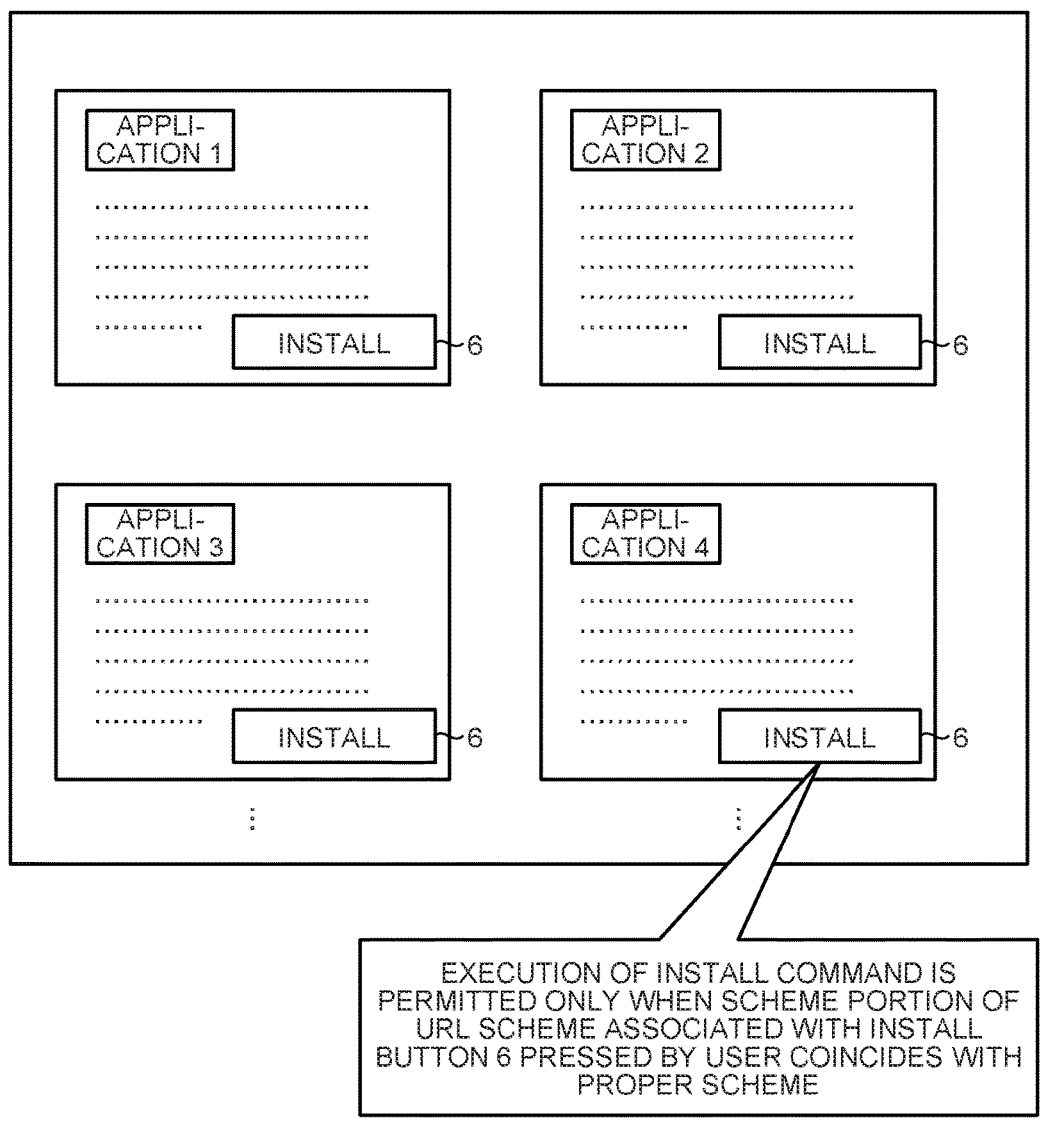
FIG. 16 is a schematic diagram for explaining a feature of the MFP in the first embodiment.

As described above, in the present embodiment, when the one or more schemes stored in the storage unit 113 include no proper scheme that coincides with the scheme portion of the URL scheme selected from the application list screen or the web screen, the browser application (permission control unit 114) does not permit the execution of the command of which the execution procedure is indicated by the selected URL scheme. Thus, as illustrated in FIG. 16, the MFP 1 according to the present embodiment permits the execution of the install command only when the scheme portion of the URL scheme associated with the install button 6 pressed by the user on the application list screen coincides with the proper scheme.

For example, a situation is assumed in which an application that is not permitted to be installed (which will be called below the "unauthorized application"), such as spyware, has been installed on the MFP 1 without notice, and the MFP 1 has acquired, from the web server 4, and has now displayed a web screen including a UI associated with a URL scheme (URL scheme indicating the execution procedure of an unpermitted command) indicating the execution procedure of a certain command executed by the unauthorized application. In such a situation, even if the user presses the UI on the web screen, the execution of the command of which the execution procedure is indicated by the URL scheme associated with the UI is not permitted unless the scheme portion of the URL scheme associated with the UI is deemed as a proper scheme. As a result, execution of the unpermitted command can be prevented.

Second Embodiment

Figure 17:
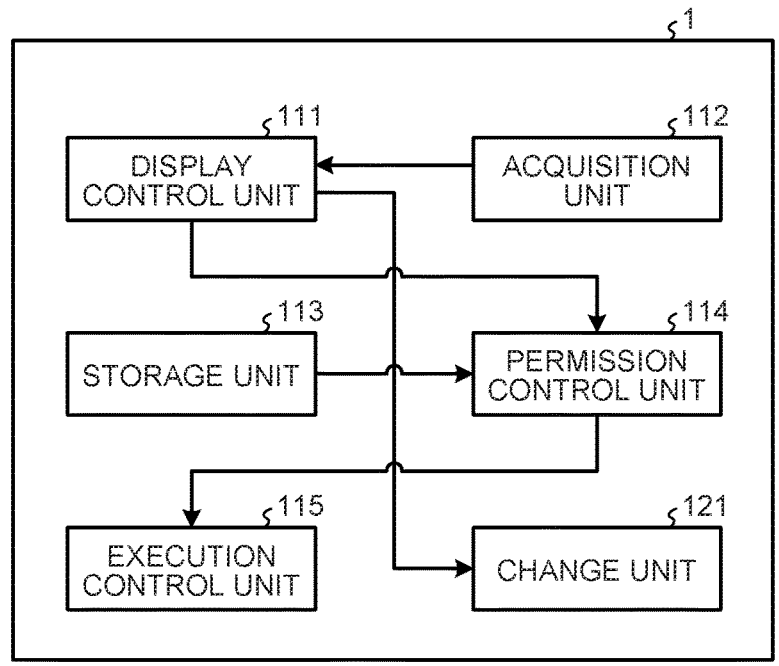
FIG. 17 is a schematic diagram illustrating exemplary functions of the MFP in a second embodiment.

The following describes a second embodiment. Descriptions in common with those of the first embodiment will be appropriately omitted. FIG. 17 is a schematic diagram illustrating exemplary functions of the MFP 1 in the present embodiment. As illustrated in FIG. 17, the MFP 1 further includes a change unit 121. In this example, the function of the change unit 121 is provided by the operation unit 20, and is implemented by the CPU 21 executing a computer program stored in, for example, the ROM 22. The function of the change unit 121 is, however, not limited to being implemented as described above, but may be implemented by, for example, a dedicated hardware circuit.

Figure 18:
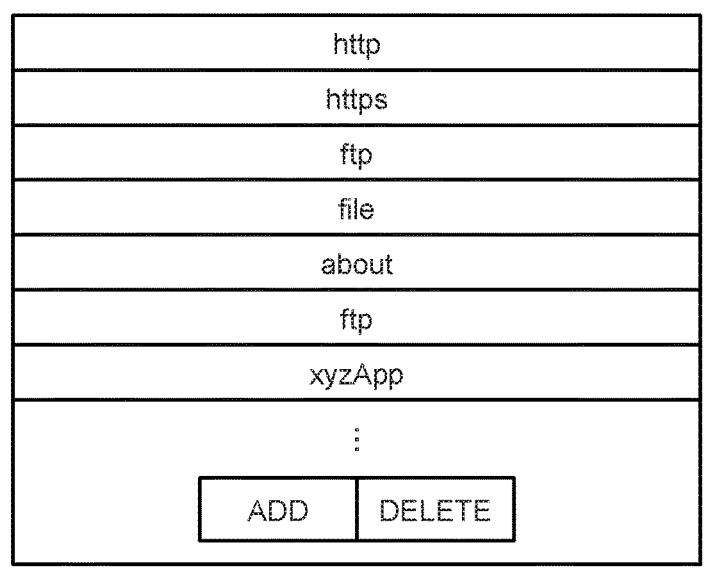
FIG. 18 is a schematic diagram illustrating an exemplary third screen.

The display control unit 111 in the present embodiment has a function (function of a third display control unit) to control display of a third screen for receiving an instruction to add or delete the command information (proper scheme). In the present embodiment, when an operation (user's operation) requesting the third screen is received, the display control unit 111 performs control to display the third screen illustrated in FIG. 18 on the operation panel 27. The third screen displays a list of the proper schemes. In this example, the user performs an operation to select any one of the proper schemes displayed on the third screen, and presses an "add" button or a "delete" button, thereby being able to instruct addition or deletion of the selected proper scheme.

Referring back to FIG. 17, when the instruction to add or delete the proper scheme is received via the third screen, the change unit 121 follows the received instruction to add or delete the proper scheme stored in the storage unit 113.

Figure 19:
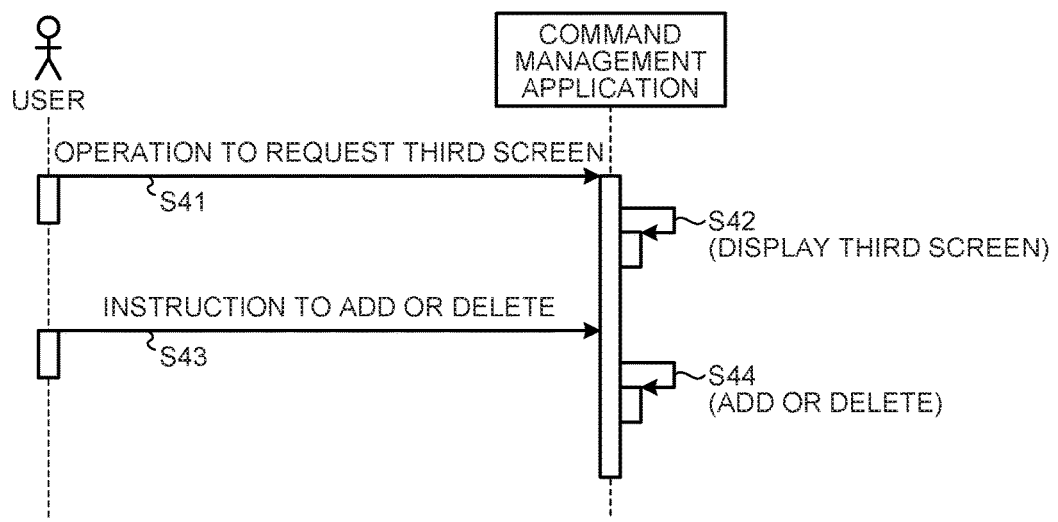
FIG. 19 is a sequence diagram illustrating an exemplary operational procedure of the MFP in the second embodiment.

FIG. 19 is a sequence diagram illustrating an exemplary operational procedure of the MFP 1 in the case of adding or deleting the proper scheme stored in the storage unit 113. As illustrated in FIG. 19, when the operation requesting the third screen is received (step S41), the command management application (display control unit 111) performs control to display the third screen illustrated in FIG. 18 on the operation panel 27 (step S42).

When the instruction to add or delete any one of the proper schemes is received via the third screen (step S43), the command management application (change unit 121) adds or deletes the proper scheme stored in the storage unit 113 in accordance with the received instruction (step S44). The other points are the same as those in the first embodiment, so that detailed descriptions thereof are omitted.

In the embodiments, the main body 10 and the operation unit 20 independently operate under different operating systems. The embodiments are, however, not limited thereto. For example, the main body 10 and the operation unit 20 may operate under the same operating system. In addition, for example, the application market server 2 and the application server 3 may be integrated into one server.

A computer program executed by the information processing system 100 (e.g., the MFP 1, the application market server 2, the application server 3, and the Web server 4) of the embodiments may be recorded and provided in a computer-readable recording medium such as a compact disc ROM (CD-ROM), a flexible disk (FD), a CD-recordable (CD-R), a digital versatile disc (DVD), and a universal serial bus (USB), as an installable or executable file. The program may be provided or distributed via a network such as the Internet. The various programs may be embedded and provided in a ROM, for example.

The present invention has an advantage of preventing the execution of unpermitted commands.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus connectable to a server via a network, the information processing apparatus comprising:
    a memory having computer readable instructions stored thereon; and
    at least one processor configured to execute the computer readable instructions to,
        acquire a first screen including an execution procedure of a first command from the server;
        display the acquired first screen on a display device;
        in a storage device one or more pieces of command information indicating information on a command permitted to be executed; and
        not permit execution of the first command when the one or more pieces of command information stored in the storage device includes no command information corresponding to the execution procedure of the first command selected from the first screen, wherein
        the execution procedure of the first command is represented by a uniform resource locator (URL) scheme, and
        a header of the URL scheme represents information for identifying an application that executes a command or information for identifying an execution procedure of the command.

2. The information processing apparatus according to claim 1, wherein the command information is information for identifying the execution procedure of the command permitted to be executed or information for identifying an application that executes the command permitted to be executed.

3. The information processing apparatus according to claim 1, wherein the at least one processor is further configured to:
    permits the execution of the first command when the one or more pieces of command information stored in the storage device includes the command information corresponding to the execution procedure of the first command selected from the first screen.

4. The information processing apparatus according to claim 1, wherein the at least one processor is further configured to:
    when the execution of the first command is not permitted, perform control to display a second screen on the display device indicating that the first command is not executable.

5. The information processing apparatus according to claim 1, wherein the command information is represented by the information in the header.

6. The information processing apparatus according to claim 5, wherein the at least one processor is further configured to:
    not permit the execution of the first command when the one or more pieces of command information stored in the storage device includes no command information coincident with the header of the URL scheme representing the execution procedure of the first command selected from the first screen.

7. The information processing apparatus according to claim 1, wherein the at least one processor is further configured to:

perform control to display a third screen on the display device for receiving an instruction to add or delete the command information; and when the instruction to add or delete the command information is received via the third screen, add or delete the command information stored in the storage device in accordance with the received instruction.

8. The information processing apparatus according to claim 1, wherein the at least one processor is further configured to:

perform control to execute the first command when the execution of the first command is permitted.

9. The information processing apparatus according to claim 8, wherein the first command is an install command.

10. The information processing apparatus according to claim 9, wherein the at least one processor is further configured to:

execute the install command when the execution of the install command is permitted.

11. An information processing method performed by an information processing apparatus connectable to a server via a network, the method comprising:

acquiring, using at least one processor, a first screen including an execution procedure of a first command from the server via the network;

displaying, using the at least one processor, the acquired first screen on a display device; and not permitting, using the at least one processor, execution of the first command when one or more pieces of command information indicating information on a command permitted to be executed that are stored in a storage device includes no command information corresponding to the execution procedure of the first command selected from the first screen, wherein the execution procedure of the first command is represented by a uniform resource locator (URL) scheme, and a header of the URL scheme represents information for identifying an application that executes a command or information for identifying an execution procedure of the command.

12. The information processing method according to claim 11, wherein the command information is represented by the information in the header.

13. The information processing method according to claim 12, further comprising:

not permitting, using the at least one processor, the execution of the first command when the one or more pieces of command information stored in the storage device include no command information coincident with the header of the URL scheme representing the execution procedure of the first command selected from the first screen.

14. The information processing method according to claim 11, further comprising:

displaying, using the at least one processor, a third screen for receiving an instruction to add or delete the command information on the display device; and when the instruction to add or delete the command information is received via the third screen, adding or deleting, using the at least one processor, the command information stored in the storage device in accordance with the received instruction.

15. The information processing method according to claim 11, further comprising:

executing, using the at least one processor, the first command when the execution of the first command is permitted.

16. A computer program product comprising a non-transitory computer-readable medium including programmed instructions that cause a computer mounted on an information processing apparatus connectable to a server via a network to execute:

acquiring, using at least one processor, a first screen including an execution procedure of a first command from the server via the network;

displaying, using the at least one processor, the acquired first screen on a display device; and not permitting, using the at least one processor, execution of the first command when one or more pieces of command information indicating information on a command permitted to be executed that are stored in a storage device includes no command information corresponding to the execution procedure of the first command selected from the first screen, wherein the execution procedure of the first command is represented by a uniform resource locator (URL) scheme, and a header of the URL scheme represents information for identifying an application that executes a command or information for identifying an execution procedure of the command.

17. The computer program product comprising a non-transitory computer-readable medium according to claim 16, wherein the command information is represented by the information in the header.

18. The computer program product comprising a non-transitory computer-readable medium according to claim 17, wherein the computer is further caused to execute:

not permitting, using the at least one processor, the execution of the first command when the one or more pieces of command information stored in the storage device include no command information coincident with the header of the URL scheme representing the execution procedure of the first command selected from the first screen.

19. The computer program product comprising a non-transitory computer-readable medium according to claim 16, wherein the computer is further caused to execute:

displaying, using the at least one processor, a third screen for receiving an instruction to add or delete the command information on the display device; and when the instruction to add or delete the command information is received via the third screen, adding or deleting, using the at least one processor, the command information stored in the storage device in accordance with the received instruction.

20. The computer program product comprising a non-transitory computer-readable medium according to claim 16, wherein the computer is further caused to execute:

executing, using the at least one processor, the first command when the execution of the first command is permitted.

* * * * *